Patented July 21, 1953

2,646,413

UNITED STATES PATENT OFFICE 2,646,413

POLYAMIDE INTERPOLYMER PLASTICIZED WITH DIACETIN

Charles W. Taylor, Akron, Ohio, assignor to Wingfoot Corporation, Akron, Ohio, a corporation of Delaware No Drawing. Application June 24, 1946, Serial No. 678,881

1 Claim. (Cl. 260—31.6)

This invention relates to an improvement in the fabrication of polyamide resins. The invention is particularly related to a new and valuable plasticizer for the preparation of polyamide interpolymers useful for impregnating fabrics. It is especially useful in practicing the invention described and claimed in copending application Serial No. 678,880, filed June 24, 1946, which relates to a fabric made by coating or impregnating woven fabrics of cold-drawn polyamide fibers with an interpolymeric polyamide and to containers made therefrom.

One purpose of this invention is to provide an improved interpolymeric polyamide, capable of use in impregnating polyamide fabrics, which is more flexible than previously known polyamides, especially at temperatures below 0° C. A further purpose of this invention is to provide a new plasticizing substance by the use of which previously used interpolymeric polyamides may be improved.

The interpolymeric polyamides are a well-known group of polyamide resins which are readily distinguishable from the polyamides ordinarily used in the preparation of cold-drawn fibers. The fiber-forming polyamides are oridinarly those which contain a uniform structure in which there is a regularly recurring molecular unit throughout the entire length of each molecule chain. Generally, these polyamides, capable of being fabricated into cold drawn filaments, are of two types (A) those prepared by the condensation of diamines with dicarboxylic acids or the corresponding esters, anhydrides, nitriles, acid chlorides, or amides and (B) those prepared by the condensation of monoamino monocarboxylic acids or the corresponding derivatives, such as esters and lactams. Filaments drawn from those polyamides experience the phenomenon known as cold-drafting when they are stretched or otherwise elongated. The cold-drawing operation strengthens the filaments and renders them less thermoplastic and more elastic. The cold-drawing property is believed to be characteristic of filaments prepared from polyamides having regularly recurring molecular structures, such as those of the following formulae:

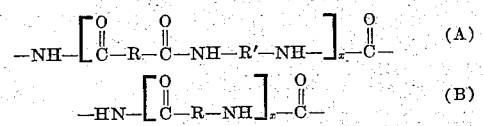

Type A of the cold drawing polyamides is prepared by the condensation of diamines and dicarboxylic acids, such as sebacic acid, suberic acid, adipic acid, succinic acid and other linear hydrocarbon dicarboxylic acids, or the aliphatic acids having molecular chains including oxygen and/or sulfur atoms in the radical between the two carboxyl groups, such as dihydracrylic acid ($HOOC-CH_2-CH_2-O-CH_2-CH_2-COOH$) and the gamma-thia-pimelic acid ($HOOC-CH_2-CH_2-S-CH_2-CH_2-COOH$) Although any dicarboxylic acid may be used, the longer chain acids, for example, those having at least three atoms between the two carbonyl groups, are preferred. The diamines used in the condensation with the dicarboxylic acids may be the hydrocarbon diamines, such as decamethylene diamine, and the oxahydrocarbon and thiahydrocarbon diamines, such as 3,3'-diaminopropyl ether and 2,2'-diaminodiethyl sulfide.

Type B of the polyamides capable of being cold drawn includes those prepared by the condensation of monoamino monocarboxylic acids or their derivatives, such as 6-aminocaproic acid, epsilon caprolactam, 9-amino-monanoic acid, 11-amino-undecanoic acid, and the corresponding acids, and the corresponding acids, esters or lactams.

The above polyamides capable of being cold-drawn are characterized by the presence of a linear structure which is uniform throughout. If polyamides are prepared from a mixture of two or more dicarboxylic acids or a mixture of two or more diamines, and especially dicarboxylic acids and diamines of different chain lengths, or if a dicarboxylic acid-diamine type of polyamide is modified by the addition of a monoamino carboxylic acid or lactam, a very different type of polyamide resin is obtained. This type of polyamide is characterized by a linear molecular chain, which is not uniform throughout, with respect to the presence of regularly recurring structural components. These polyamides which are not uniform molecularly are more thermoplastic and are not so readily influenced by cold working as are the polyamides of uniform molecular structure throughout. The polyamides which are not uniform molecularly are known as "interpolymers" as distinguished from the uniform polymers of the types above described.

The polyamide interpolymers may be prepared from a mixture of dicarboxylic acids and a diamine, the total proportion of the dicarboxylic acids being the approximate molecular equivalent of the diamine. For example, one mole of succinic acid and two moles of sebacic acid may be condensed with three moles of decamethylene diamine. Similarly, a mixture of equimolar proportions of a dicarboxylic acid and of a diamine may be mixed and condensed with any proportion of a monoamino monocarboxylic acid. An example of this latter type of interpolymer is the polyamide prepared from one mole of adipic acid, one mole of hexamethylene diamine and two moles of epsilon caprolactam. It will be apparent that the caprolactam need not be present in any particular molecular proportion so long as equivalent proportions of the dicarboxylic acid and the diamine are used, since mixtures of condensing compounds will always contain approximately equal numbers of reactive amino groups and reactive carboxylic radicals. The polyamide interpolymers are well known commercial materials available on the market.

It has been found that interpolymeric polyamides are greatly improved by the incorporation of a minor proportion of diacetin (glyceryl diacetate). The addition of the diacetin serves to plasticize the interpolyamide resin and to greatly improve the flexibility and resistance to flexural forces by the fabrics which are impregnated with such plasticized polyamide resin, especially at temperatures below 0° C. The plasticizer is also valuable because it does not adversely affect the surface of the resin composition by forming a film of plasticizer. The improvement manifested by the use of diacetin is greatly superior to the benefits achieved from other known plasticizers such as polyglycerol, dihydroxy diphenyl sulfone, glycerol, mixtures of glue and glycerol, and sodium thiocyanate.

In the practice of this invention any proportion of the diacetin will manifest an improvement in the polyamide. However, generally, from 5 to 25 percent by weight and preferably 10 percent to 20 percent by weight is used.

The diacetin is incorporated in the interpolyamide resin by mixing in solution, preferably in ethyl alcohol, in any conventional mixing apparatus, such as a rotary stirred container, by heating to a temperature from 100° to 180° F.

The plasticized interpolymeric polyamides are useful in impregnating any kind of woven fabric of natural textile or synthetic fiber, such as silk, cotton, wool or linen to provide a fabric which is resistant to the action of hydrocarbons, and especially the aromatic hydrocarbon fuels. The plasticized resins are particularly valuable when used to impregnate and coat fabrics woven from yarn or thread prepared by spinning cold-drawn polyamide fibers, especially of the types described above. The plasticized resins are also useful in the preparation of cast films for packaging where low temperatures are to be encountered.

Further details of this invention are set forth with respect to the following examples.

*Example 1*

A polyamide interpolymer comprising the reaction product of 13.6 percent by weight of hexamethylene diamine, 23.4 percent of sebacic acid, and 63 percent of epsilon caprolactam, having an intrinsic viscosity of 1.43 and a melting point of 155° C. to 165° C., was thoroughly mixed with varying amounts of diacetin.

The samples, containing proportions of the plasticizer varying from 0 to 20 percent, were used to coat woven fabrics of cold-drawn filaments of the hexamethylene adipamide polymer (nylon). The coated fabrics were subjected to a temperature of −20° F. for 48 hours and tested by manually flexing them and observing the general behavior of the coated fabric. To show the effect of commercially used plasticizers, identical tests were made of the same polyamide interpolymer containing varying proportions of polyglycerol and 4,4'-dihydroxy-diphenyl sulfone, both of which are widely used as plasticizers for polyamide interpolymers.

The following data was obtained:

| Plasticizer | Quantity, Percent by Weight | | | | |
| --- | --- | --- | --- | --- | --- |
| | 0 | 5 | 10 | 15 | 20 |
| Polyglycerol | Failure | Failure | Failure | Failure | Partial failure. |
| 4,4'-dihydroxydiphenyl sulfone | | do | do | do | Failure. |
| Diacetin | | | Partial failure | Good | Excellent. |

*Example 2*

Using the test methods described in the preceding example, the relative plasticizing effects of diacetin and of the two conventional plasticizers were investigated for a polamide interpolymer resin made by the condensation of about 19 percent by weight of hexamethylene diamine, 25 percent of adipic acid, and 56 percent of epsilon-caprolactam, having an intrinsic viscosity of 1.56 and a melting point of 170 to 200° C.

The following is a tabulation of the test results after freezing at −20° F. for 48 hours.

| Plasticizer | Quantity | | | |
| --- | --- | --- | --- | --- |
| | 0 | 5 | 10 | 20 |
| Polyglycerol | Failure | Failure | Failure | Partial failure. |
| 4,4'-dihydroxydiphenyl sulfone | | do | do | Failure. |
| Diacetin | | Good | Good | Excellent. |

In the above tests it was found to be impractical to record the results in quantitative measurements. The remarks as recorded indicate the effect of the plasticizer in the preparation of useful coated fabrics as follows: "failure" means that the film was shattered when the sample was flexed manually; "partial failure" means that the sample did not shatter, but merely developed slight surface cracks when flexed, "good" means that no fractures occurred but the sample was not soft and flexible, and "excellent" means that the samples remained in perfect condition after flexing manually and in addition were soft and pliable. In all tests the manual flexing was done at −20° F. by methods which subjected all samples to equivalent stress and strain.

Although the invention has been described with respect to specific examples, it is not intended that the details thereof shall be construed as limitations upon the scope of the invention except to the extent incorporated in the following claim.

I claim:

A polyamide interpolymer resulting from the condensation of 19 percent by weight of hexamethylene diamine, 25 percent of adipic acid and 56 percent of epsilon caprolactam containing, as a plasticizer, 5 to 20 percent by weight of diacetin.

CHARLES W. TAYLOR.

References Cited in the file of this patent

UNITED STATES PATENTS

| Number | Name | Date |
|---|---|---|
| 2,071,250 | Carothers | Feb. 16, 1937 |
| 2,099,047 | Bradshaw | Nov. 16, 1937 |
| 2,312,469 | Freund | Mar. 2, 1943 |
| 2,312,913 | Kirby | Mar. 2, 1943 |
| 2,337,834 | Peters | Dec. 28, 1943 |
| 2,361,009 | Carman et al. | Oct. 24, 1944 |

OTHER REFERENCES

Durrans: "Solvents," pages 189–190, (1938), Chapman and Hall, Ltd., London.

Meyer: "Natural and Synthetic High Polymers," volume IV, pages 494–495 (1942), Interscience Pub., Inc., New York.

Schmidt: Marlies, Principles of High-Polymer Theory and Practice, page 151, published by McGraw-Hill, N. Y. 1948.

Pinner: "Cross Linking of Protein Plastics" British Plastics, Nov. 1950, volume 23.